US008287985B2

(12) United States Patent
Sjoberg

(10) Patent No.: US 8,287,985 B2
(45) Date of Patent: Oct. 16, 2012

(54) EMBOSSED DECORATIVE BOARDS

(75) Inventor: Ake Sjoberg, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 425 days.

(21) Appl. No.: 10/477,141

(22) PCT Filed: May 3, 2002

(86) PCT No.: PCT/SE02/00856

§ 371 (c)(1), (2), (4) Date: Dec. 3, 2003

(87) PCT Pub. No.: WO02/090129

PCT Pub. Date: Nov. 14, 2002

(65) Prior Publication Data

US 2004/0170812 A1 Sep. 2, 2004

(30) Foreign Application Priority Data

May 10, 2001 (SE) ....................................... 0101620

(51) Int. Cl.

| | |
|---|---|
| ***B32B 3/00*** | (2006.01) |
| ***B32B 29/00*** | (2006.01) |
| ***B32B 27/42*** | (2006.01) |
| ***B32B 27/08*** | (2006.01) |

(52) U.S. Cl. ..................... 428/156; 428/537.5; 428/511; 428/535; 428/503

(58) Field of Classification Search .................. 428/156, 428/195, 211.1, 172, 537.5, 533, 511, 106, 428/105, 114, 151, 195.1, 534, 503; 52/313

See application file for complete search history.

(56) References Cited

U.S. PATENT DOCUMENTS 3,055,065 A * 9/1962 Elmendorf ...................... 428/50
4,678,702 A 7/1987 Lancaster et al. ............. 428/252

(Continued)

FOREIGN PATENT DOCUMENTS

GB 1407052 9/1975
GB 1472629 5/1977
GB 2088280 6/1982

(Continued)

*Primary Examiner* — Catherine A Simone

(74) *Attorney, Agent, or Firm* — Jenkins, Wilson, Taylor & Hunt, P.A.

(57) ABSTRACT

Embossed decorative boards (1) having a first and a second opposite edge ($1^I$ and $1^{II}$ respectively) with a third and a fourth adjacent edge ($1^{III}$ and $1^{IV}$ respectively). The board (1) include an upper side decorative surface (2) an upper side embossing and a base layer. The embossing is comprised by surface structure areas (10) of which at least four are first and second outermost surface structure areas ($10^L$ and $10^R$ respectively). The first outermost surface structure areas ($10^L$) has each one end edge coinciding with the first edge ($1^I$) of the board (1) while the second outermost surface structure areas ($10^R$) has each one end edge coinciding with the second edge ($1^{II}$). At least two surface structures having different visual characteristics is used, wherein two adjacent outermost surface structure areas ($10^L$ and $10^R$ respectively) within the same board (1) has different surface structures. The first outermost surface structure areas ($10^L$) of the first edge ($1^I$) is numbered $L^I$, $L^{II}$, $L^{III}$ etc. in a subsequent order starting from the third edge ($1^{III}$) while the second outermost surface structure areas ($10^R$) of the second edge ($1^I$) is numbered $R^I$, $R^{II}$, $R^{III}$ etc. The end edge of the outermost surface structure areas ($10^L$ and $10^R$ respectively) with the same ordinal number of the first edge ($1^I$) and the second edge ($1^{II}$) has mainly the same length while of the surface structure is similar.

20 Claims, 3 Drawing Sheets

U.S. PATENT DOCUMENTS

| | | | | | |
|---|---|---|---|---|---|
| 4,940,503 | A | * | 7/1990 | Lindgren et al. | 156/279 |
| 5,744,220 | A | | 4/1998 | Ringo | 428/195 |
| 6,132,883 | A | | 10/2000 | McGrath et al. | 428/457 |

FOREIGN PATENT DOCUMENTS

| | | |
|---|---|---|
| SE | 512210 | 2/2000 |

* cited by examiner

EMBOSSED DECORATIVE BOARDS

CROSS-REFERENCE TO RELATED APPLICATIONS

This application is a §371 Application of International Application No. PCT/SE02/00856, filed on May 3, 2002, claiming the priority of Swedish Application No. 0101620-3, filed May 10, 2001, the entire disclosures of which are incorporated herein by reference in their entireties.

FIELD OF THE INVENTION

The present invention relates to decorative boards with a surface structure of the upper surface.

BACKGROUND

Products coated with thermosetting laminates are frequent today. They are foremost used where the demand for abrasion resistance is high, but also where resistance towards different chemicals and moisture is required. As an example of such products floors, floor beadings, table tops, work tops and wall panels can be mentioned.

The thermosetting laminate mostly consists of a number of base sheets with a decor sheet placed closest to the surface. The decor sheet can be provided with a desired decor or pattern. The most frequent patterns usually represent the image of different kinds of wood, or minerals such as marble or granite. The surface of the laminate can be provided with a structure during the laminating procedure which will make the decor more realistic. Press plates with structure or structure foils are frequently used when manufacturing such a laminate. A negative reproduction of the structure in the press plate or the foil will be imprinted into the laminate during the laminating procedure.

The structure suitably represents features characteristic for the pattern the decor represents in the laminate. The structure can be made coarse to simulate for example roughly planed stone, or smooth with randomly placed pits and micro cracks to simulate polished marble. A wood surface can for example be simulated by providing the surface with randomly placed thin oblong indentations which imitate pores. These indentations must be oriented in the direction of the growth of the simulated wood, which is indicated by the pattern of the grains, in order to make the result realistic.

It has for a long time been a great need to be able to manufacture a decorative thermosetting laminate with a decor pattern with a surface structure as life like as the decor reproduced.

SUMMARY OF THE INVENTION

According to the present invention the above mentioned needs have been met and a decorative board with a decorative surface with a matching surface structure that overlaps adjoining boards has been achieved. The invention relates to embossed decorative boards having a first and a second opposite edge with adjacent third and a fourth edges. The boards includes an upper side decorative surface, an upper side embossing and a base layer. The invention is characterised in that the embossing is comprised by surface structure areas of which at least four are first and second outermost surface structure areas. The first outermost surface structure areas has each one end edge coinciding with the first edge of the board while the second outermost surface structure areas has each one end edge coinciding with the second edge. The second edge is arranged opposite to the first edge. At least two surface structures having different visual characteristics is used, wherein two adjacent outermost surface structure areas within the same board has different surface structures. The different surface structures can be arranged into surface structure groups after its visual characteristics whereby the first outermost surface structure areas of the first edge is numbered $L^{I}$, $L^{II}$, $L^{III}$ etc. in a subsequent order starting from the third edge. The second outermost surface structure areas of the second edge is numbered $R^{I}$, $R^{II}$, $R^{III}$ etc. in a subsequent order starting from the third edge. The end edge of the outermost surface structure areas with the same ordinal number of the first edge and the second edge hereby has mainly the same length. The outermost surface structure area with the same ordinal number of the first edge and the second edge has a similar surface structure.

According to one embodiment of the invention the base layer may consist of a number of conventional dry base layer paper webs or base layer paper sheets which are impregnated with a thermosetting resin. The resin in the uppermost of these is preferably melamine-formaldehyde resin while the rest of the webs or sheets for example may contain melamine-formaldehyde resin or phenol-formaldehyde resin. The decor paper web or decor paper sheet respectively, is hereby placed on top of the conventional base layer webs or base layer sheets after which the different paper webs or a stack of sheets respectively are continuously or discontinuously laminated together at an elevated pressure and an elevated temperature.

The surface layer of the laminate may suitably include a so called overlay paper, placed on top of the decor paper. The overlay paper is suitably impregnated with melamine-formaldehyde resin. At least one of the thermosetting resin impregnated sheets, preferably the uppermost one is preferably coated with hard particles, for example silica, aluminium oxide and/or silicon carbide with an average size of 1-100 μm, preferably around 5-60 μm.

The overlay may alternatively be replaced by, or used together with, a layer of ionomeric polymer where the polymer for example is constituted of ethylene-methacrylateacid-copolymer while the ions for example are constituted of sodium, zinc or lithium even though other ionomeric polymers are usable. It is also in this embodiment suitable to utilise hard particles as described above.

According to one embodiment of the invention the base layer consists of a particle board or a fibre board. Such a base layer may be 5-20 mm thick.

According to one embodiment of the invention the decor pattern consists of a number of sections of parallel rows of bars, where the bars in adjoining rows are mutually offset in the longitudinal direction. The most popular decor used on floor boards is different kinds of wood and minerals. The surface structures narrow indentations in the surface of 0.1-10 mm width which simulates pores, cracks, graining, joints, and knots. It is also possible to use micro structures achieving matte or semi gloss surfaces. The latter can also be used in combination with the above.

According to one embodiment of the invention a demarcation consisting of a 1-20 mm wide, preferably 3-10 mm wide, field without any surface structure is used between adjacent structure areas.

According to an alternative embodiment of the invention a demarcation consisting of a 1-20 mm wide, preferably 3-10 mm wide, field were one surface structure gradually transforms into another surface structure

BRIEF DESCRIPTION OF THE DRAWINGS

The invention is further explained in connection to the accompanying drawings showing different embodiments of the invention where.

DETAILED DESCRIPTION OF THE INVENTION

Figure 1:
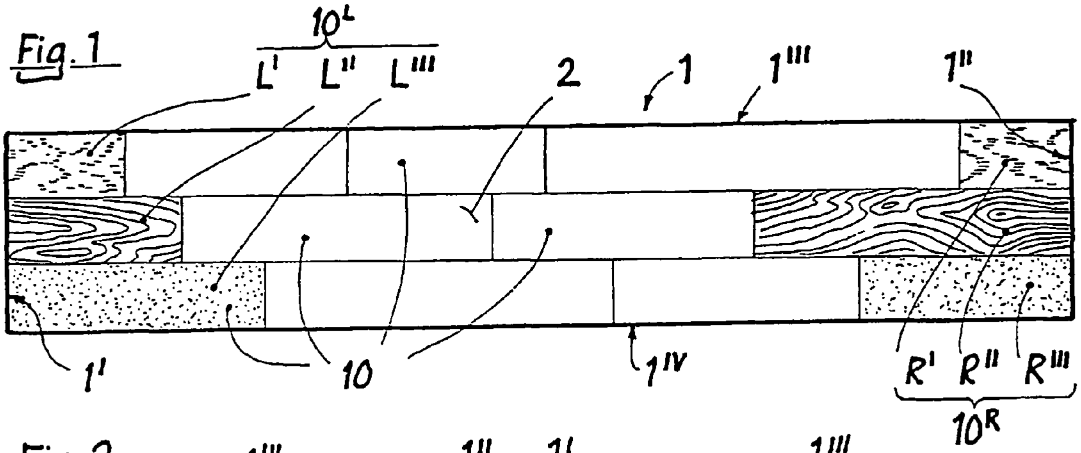
FIG. 1 shows schematically an embossed decorative board 1 in the form of a floor board according to an embodiment of the invention.
Figure 8:
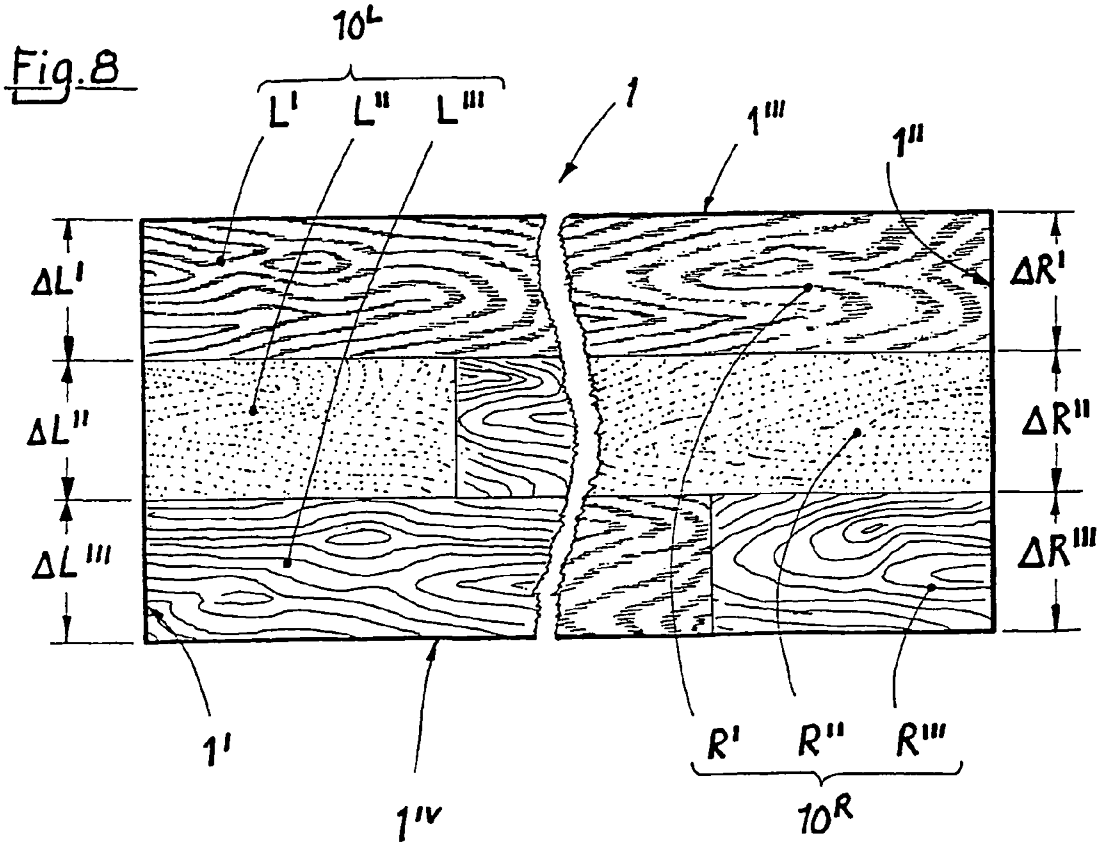
FIG. 8 shows schematically parts of an embossed decorative board 1 mainly corresponding to the embodiment shown in FIG. 1.

Accordingly, FIGS. 1 and 8 shows schematically an embossed decorative board 1 in the form of a floor board having a first edge $1^{I}$ and a second opposite edge $1^{II}$ with a third and a fourth adjacent edge $1^{III}$ and $1^{IV}$ respectively. The board 1 include an upper side decorative surface 2, an upper side embossing and a base layer. The embossing is comprised by a flat surface with recesses. The recesses are in the drawing represented by black lines. The embossing is comprised by surface structure areas 10 of which at least four are first and second outermost surface structure areas $10^{L}$ and $10^{R}$ respectively. Only the outermost surface structure areas $10^{L}$ and $10^{R}$ respectively are for reasons of simplicity provided with structure representation in the drawing. The first outermost surface structure areas $10^{L}$ has each one end edge coinciding with the first edge $1^{I}$ of the board 1 while the second outermost surface structure areas $10^{R}$ has each one end edge coinciding with the second edge $1^{II}$. The second edge $1^{II}$ is arranged opposite to the first edge $1^{I}$. At least two surface structures having different visual characteristics is used, wherein two adjacent outermost surface structure areas $10^{L}$ and $10^{R}$ respectively within the same board 1 has different surface structures. The different surface structures is arranged into surface structure groups after its visual characteristics whereby the first outermost surface structure areas $10^{L}$ of the first edge $1^{I}$ is numbered $L^{I}$, $L^{II}$ and $L^{III}$ in a subsequent order starting from the third edge $1^{III}$. The second outermost surface structure areas $10^{R}$ of the second edge $1^{I}$ is numbered $R^{I}$, $R^{II}$ and $R^{III}$ in a subsequent order starting from the third edge $1^{III}$. The end edge of the outermost surface structure areas $10^{L}$ and $10^{R}$ respectively with the same ordinal number of the first edge $1^{I}$ and the second edge $1^{II}$ has mainly the same length A (see FIG. 8) while the outermost surface structure area $10^{L}$ and $10^{R}$ respectively with the same ordinal number of the first edge $1^{I}$ and the second edge $1^{II}$ has a similar surface structure. Accordingly, as shown in FIG. 8, the length of $\Delta L^{I}$ is mainly the same as the length of $\Delta R^{I}$, the length of $\Delta L^{II}$ is mainly the same as the length of $\Delta R^{II}$ and the length of $\Delta L^{III}$ is mainly the same as the length of $\Delta R^{III}$.

Figure 2:
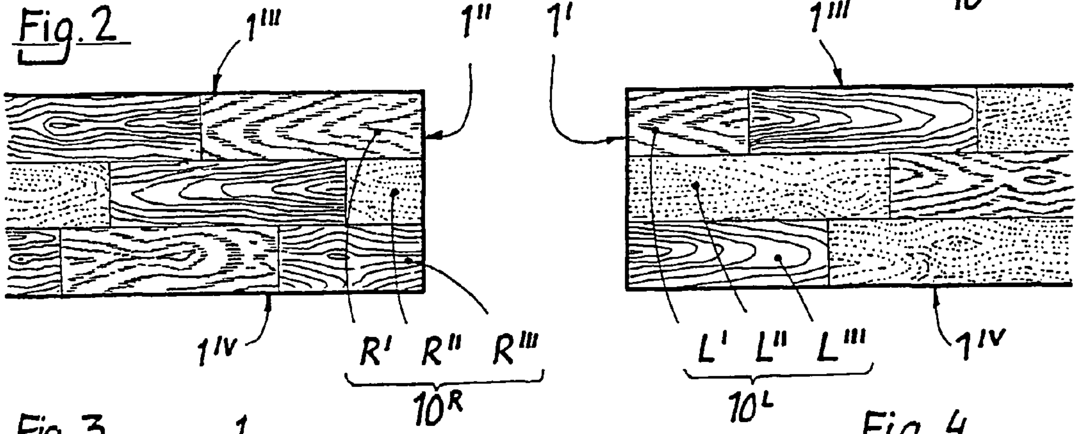
FIG. 2 shows schematically end parts of two embossed decorative boards 1 according to an embodiment of the invention.

FIG. 2 shows schematically end parts of two embossed decorative boards 1, in the form of a floor boards, before joining. The boards 1 have a first edge $1^{I}$ and a second opposite edge $1^{II}$ with a third and a fourth adjacent edge $1^{III}$ and $1^{IV}$ respectively. The boards 1 includes an upper side decorative surface 2, an upper side embossing and a base layer. The embossing is comprised by a flat surface with recesses. The recesses are in the drawing represented by black lines. The embossing is comprised by surface structure areas 10 of which at least four are first and second outermost surface structure areas $10^{L}$ and $10^{R}$ respectively. The first outermost surface structure areas $10^{L}$ has each one end edge coinciding with the first edge $1^{I}$ of the board 1 while the second outermost surface structure areas $10^{R}$ has each one end edge coinciding with the second edge $1^{II}$. The second edge $1^{II}$ is arranged opposite to the first edge $1^{I}$. At least two surface structures having different visual characteristics is used, wherein two adjacent outermost surface structure areas $10^{L}$ and $10^{R}$ respectively within the same board 1 has different surface structures. The different surface structures is arranged into surface structure groups after its visual characteristics whereby the first outermost surface structure areas $10^{L}$ of the first edge $1^{I}$ is numbered $L^{I}$, $L^{II}$ and $L^{III}$ in a subsequent order starting from the third edge $1^{III}$. The second outermost surface structure areas $10^{R}$ of the second edge $1^{I}$ is numbered $R^{I}$, $R^{II}$ and $R^{III}$ in a subsequent order starting from the third edge $1^{III}$. The end edge of the outermost surface structure areas $10^{L}$ and $10^{R}$ respectively with the same ordinal number of the first: edge $1^{I}$ and the second edge $1^{II}$ has mainly the same length while the outermost surface structure area $10^{L}$ and $10^{R}$ respectively with the same ordinal number of the first edge $1^{I}$ and the second edge $1^{II}$ has a similar surface structure.

Figure 3:
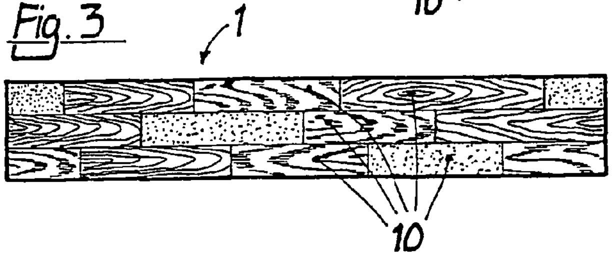
FIG. 3 shows schematically a rectangular embossed decorative board 1 according to a second embodiment of the invention.

FIG. 3 shows schematically a rectangular embossed decorative board 1 with short edge to long edge ratio of one to six. The embossing is comprised by a flat surface with recesses. The recesses are in the drawing represented by black lines. The embossing represents three longitudinal rows of surface structure areas 10 where three different types of surface structures is used. The board 1 shown in FIG. 3 corresponds mainly with the embodiments shown in FIGS. 1 and 2 above.

Figure 4:
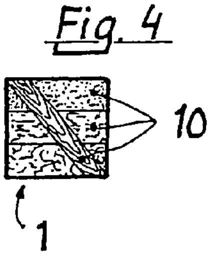
FIG. 4 shows schematically quadratic embossed decorative board 1 according to a third embodiment of the invention.

FIG. 4 shows schematically quadratic embossed decorative board 1. The embossing is comprised by a flat surface with recesses. The recesses are in the drawing represented by black lines. The embossing represents three longitudinal rows of surface structure areas 10 interrupted by a narrow diagonal bar. Four different types of surface structures is used. The board 1 shown in FIG. 3 corresponds mainly with the embodiments shown in FIGS. 1, 2 and 3 above.

Figure 5:
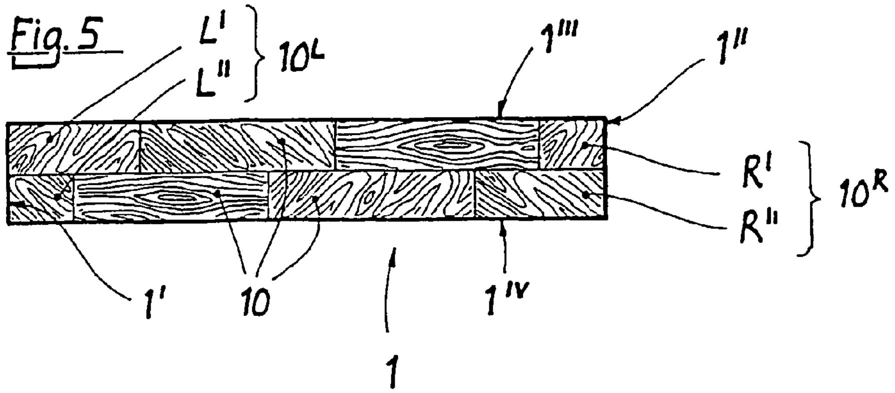
FIG. 5 shows schematically a rectangular embossed decorative board 1 according to a fourth embodiment of the invention.
Figure 6:
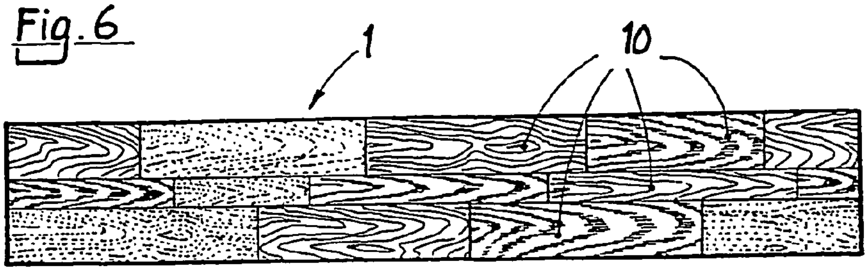
FIG. 6 shows schematically a rectangular embossed decorative board 1 according to a fifth embodiment of the invention.

FIG. 5 shows schematically a rectangular embossed decorative board 1 with short edge to long edge ratio of one to six. The embossing is comprised by a flat surface with recesses. The recesses are in the drawing represented by black lines. The embossing represents two longitudinal rows of surface structure areas 10 where three different types of surface structures is used. The different surface structures is arranged into surface structure groups after its grain direction whereby the first outermost surface structure areas $10^{L}$ of the first edge $1^{I}$ is numbered $L^{I}$ and $L^{II}$ in a subsequent order starting from the third edge $1^{III}$. The second outermost surface structure areas $10^{R}$ of the second edge $1^{I}$ is numbered $R^{I}$ and $R^{II}$ in a subsequent order starting from the third edge $1^{III}$. The end edge of the outermost surface structure areas $10^{L}$ and $10^{R}$ respectively with the same ordinal number of the first edge $1^{I}$ and the second edge $1^{II}$ has mainly the same length while the surface structure of the outermost surface structure area $10^{L}$ and $10^{R}$ respectively with the same ordinal number of the first edge $1^{I}$ and the second edge $1^{II}$ has a similar surface structure.

Figure 7:
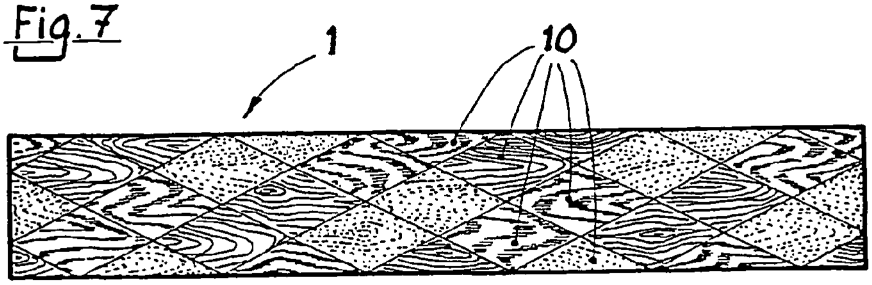
FIG. 7 shows schematically a rectangular embossed decorative board 1 according to a sixth embodiment of the invention.

FIG. 7 shows schematically a rectangular embossed board 1 with short edge to long edge ratio of one to six. The embossing is comprised by a flat surface with recesses. The recesses are in the drawing represented by black lines. The embossing represents rhomboidal surface structure areas 10 where three different types of surface structures are used.

FIG. 7 shows schematically a rectangular embossed decorative board 1 with short edge to long edge ratio of one to six. The embossing is comprised by a flat surface with recesses. The recesses are in the drawing represented by black lines. The embossing represents rhomboidal surface structure areas 10 where three different types of surface structures is used.

FIG. 8 is described together with FIG. 1 above.

Figure 9:
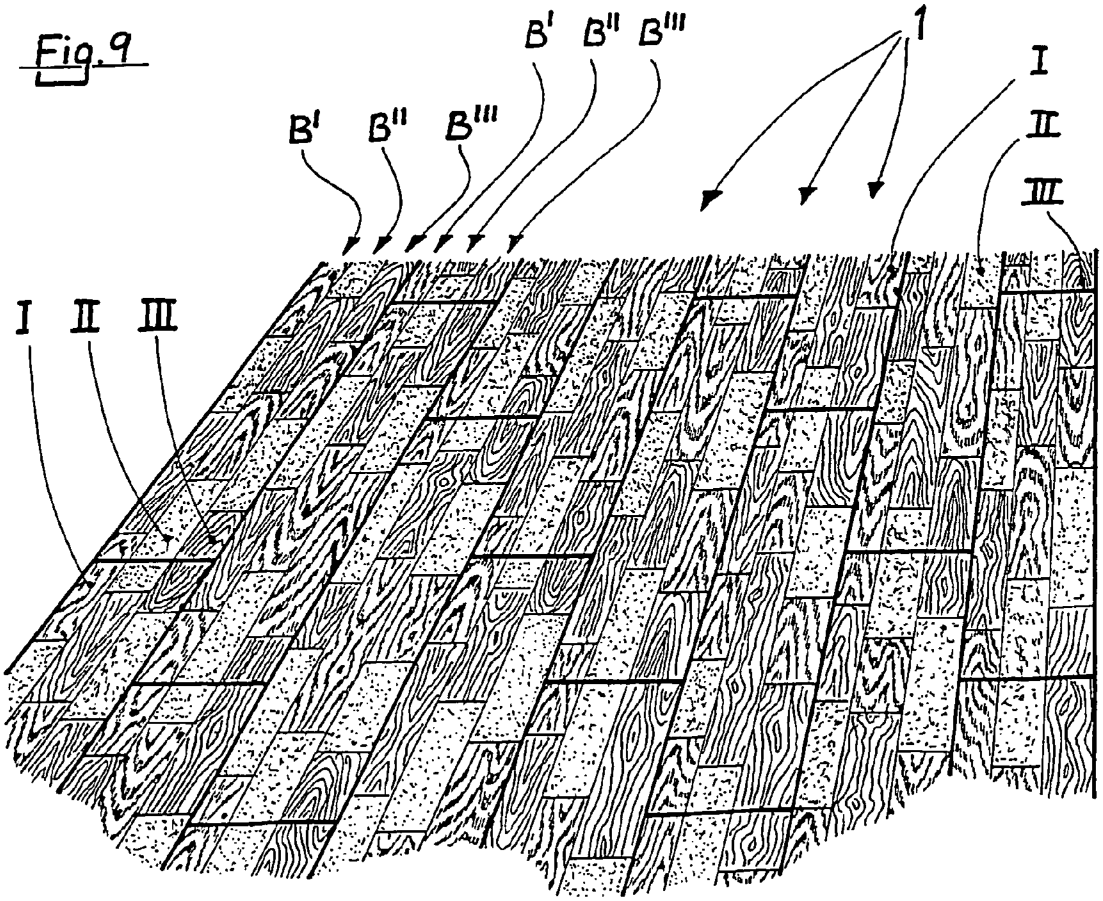
FIG. 9 shows schematically the embossing of an installed floor covering according to an embodiment of the invention.

FIG. 9 shows schematically the embossing of an installed floor covering consisting of rectangular decorative boards 1 according to the invention. The boards 1 used corresponds mainly with the embodiment shown in FIG. 3. The joints between the boards 1 are in the drawing illustrated by being drawn with heavier lines. The boards 1 have three longitudinal row of surface structure areas 10 of which the outermost surface structures $\mathbf{10}^L$ and $\mathbf{10}^R$ respectively are arranged so that a first row $B^I$ of each board 1 ends with surface structure type I at both short side ends while the second and the third row $B^{II}$ and $B^{III}$ respectively ends with surface structure type II and III respectively. The intermediate surface structure areas 10 is arranged in a random order with the provision that two adjacent surface structure areas 10 of the same row is not of the same surface structure type.

The invention is not limited by the shown embodiments since they can be varied in different ways within the scope of the invention.

The invention claimed is:

1. A system of embossed decorative boards, each board being rectangular in shape; each board having a first and a second opposite short edge with a third and a fourth adjacent long edge, which third and fourth edges are opposite each other, which board includes an upper side decorative surface comprising a decor paper or decor sheet, the decor paper or decor sheet being covered with an overlying layer comprising embossing on its upper side, and a base layer, wherein the décor paper or décor sheet comprises a décor pattern, the décor pattern being one selected from the group consisting of wood and minerals, and providing a first visual effect, wherein the embossing is comprised by surface structure areas of which at least four are first, second, third and fourth outermost surface structure areas on each decorative board, the first outermost surface structure areas each having one end edge coinciding with the first edge of the board, being arranged opposite to the second outermost surface structure areas having each one end edge coinciding with the second edge of the board, the third outermost surface structure areas have each one end edge coinciding with the third edge of the board and the fourth outermost surface structure areas having each one end edge coinciding with the fourth edge of the board, that at least two surface structures having different textures are present on each of the third and fourth long edges used each texture providing a second visual characteristic, the surface structures each comprising at least one texture selected from the group consisting of recesses, pores, cracks, graining, joints pits, knots, and microstructuring; wherein two adjacent outermost surface structure areas within the same board have different surface structures, that the different surface structures can be arranged into surface structure groups according to its surface structure characteristics whereby the first outermost surface structure areas of the first edge is numbered $L^I$, $L^{II}$, etc, in a subsequent order starting from the third edge and that the second outermost surface structure areas of the second edge is numbered $R^I$, $R^{II}$, etc, in a subsequent order starting from the third edge ($L^{III}$) whereby the end edge of the outermost surface structure areas with the same ordinal number of the first edge in combination with the second edge has mainly the same length and furthermore the outermost surface structure area with the same ordinal number of the first edge and the second edge has a similar surface structure, and at least some of the third outermost surface structure areas of the third edge of the board have the same texture and second visual characteristics as at least some of the fourth outermost surface structure areas of the fourth edge of the board, a demarcation comprising a 1-20 mm wide field without any surface structure being present between adjacent, but different, surface structure areas on the long edges, whereby when two boards are assembled along their long edges the surface structure areas having the same texture and second visual characteristics overlaps each adjoining edge of the adjoining boards.

2. The system according to claim 1, wherein the decorative surface comprises a number of dry base layer paper webs or base layer paper sheets which are impregnated with a thermosetting resin, wherein the decorative surface comprising the décor paper web or the decor paper sheet is placed on top of the base layer webs or base layer sheets.

3. The system according to claim 1, wherein the base layer consists of a particle board or a fibre board.

4. The system according to claim 1, wherein the decor pattern consists of a number of sections of parallel rows of bars, where the bars in adjoining rows are mutually offset in the longitudinal direction.

5. The system according to claim 1, further comprising a 1-20 mm wide field where one surface structure gradually transforms into another surface structure.

6. The system according to claim 1, wherein the decorative surface includes at least one overlay paper, placed on top of the decor paper.

7. The system according to claim 6, wherein the overlay paper is impregnated with melamine-formaldehyde resin.

8. The system according to claim 7, wherein at least one of the resin impregnated sheets is coated with hard particles with an average size of 1-100 μm.

9. The system according to claim 1, wherein the upper side decorative surface comprises a decorative layer and an ionomeric polymer.

10. The system according to claim 1, wherein the upper side decorative surface is constituted of a decorative layer, an ionomeric polymer and hard particles.

11. The system according to claim 1, wherein the upper side decorative surface is constituted of a decorative layer, an ionomeric polymer, overlay paper, impregnated with melamine formaldehyde and hard particles.

12. The system according to claim 8, wherein the decorative surface is made of paper.

13. The system according to claim 2, wherein the thermosetting resin in an uppermost layer is melamine formaldehyde resin.

14. The system according to claim 2, wherein the thermosetting resin in a base layer is one selected from the group consisting of melamine formaldehyde resin and phenol-formaldehyde resin.

15. The system according to claim 1, wherein the demarcation is 3-10 mm wide.

16. The system according to claim 5, wherein the demarcation is 3-10 mm wide.

17. The system according to claim 8, wherein hard particles are selected from the group consisting of silica, aluminum oxide, silicon carbide and mixtures thereof.

18. The system according to claim 8, wherein the average particle size is 5-60 μm.

19. The system according to claim 1, wherein the textures are at least one selected from the group consisting of recesses, pores, cracks, joints and knots and microstructuring.

20. The system of claim 19, wherein the textures on the long edges of the boards are asymmetric to a longitudinal axis of the rectangular board, such that the texture appears to extend across the long edge of one board to a long edge of an adjacent board when the boards are assembled.

* * * * *